United States Patent
Cho et al.

(10) Patent No.: US 11,909,074 B2
(45) Date of Patent: Feb. 20, 2024

(54) FLEXIBLE BATTERY MANUFACTURING METHOD

(71) Applicant: AMOGREENTECH CO., LTD., Gimpo-si (KR)

(72) Inventors: Hyeon Woo Cho, Cheonan-si (KR); Ju Hee Jang, Uijeongbu-si (KR)

(73) Assignee: Amogreentech Co., Ltd., Gimpo-si (KR)

( * ) Notice: Subject to any disclaimer, the term of this patent is extended or adjusted under 35 U.S.C. 154(b) by 632 days.

(21) Appl. No.: 17/044,072

(22) PCT Filed: Jun. 11, 2019

(86) PCT No.: PCT/KR2019/007011
§ 371 (c)(1),
(2) Date: Sep. 30, 2020

(87) PCT Pub. No.: WO2019/240468
PCT Pub. Date: Dec. 19, 2019

(65) Prior Publication Data
US 2021/0143519 A1    May 13, 2021

(30) Foreign Application Priority Data
Jun. 11, 2018    (KR) .................. 10-2018-0066814

(51) Int. Cl.
*H01M 50/618*    (2021.01)
*H01M 10/0525*    (2010.01)
(Continued)

(52) U.S. Cl.
CPC ....... *H01M 50/618* (2021.01); *H01M 10/058* (2013.01); *H01M 10/0525* (2013.01); *H01M 50/105* (2021.01)

(58) Field of Classification Search
CPC .................................. H01M 50/618
See application file for complete search history.

(56) References Cited

U.S. PATENT DOCUMENTS 6,706,440 B1 * 3/2004 Takimoto ............ H01M 50/618
    141/241
9,859,569 B2    1/2018 Takada et al.
(Continued)

FOREIGN PATENT DOCUMENTS

CN        102403484 A  *  4/2012
CN        104106156 A     10/2014
(Continued)

OTHER PUBLICATIONS

Machine translation of JP H11-339770 A (Year: 1999).*
International Search Report cited in PCT/KR2019/007011 dated Sep. 20, 2019, 2 pages.

*Primary Examiner* — Robert S Carrico
(74) *Attorney, Agent, or Firm* — Rothwell, Figg, Ernst & Manbeck, P.C.

(57) ABSTRACT

A manufacturing method for a flexible battery including injecting an electrolyte into an opening of an exterior material accommodating an electrode assembly contained therein and impregnating the electrode assembly with the electrolyte through a pressure difference inside the exterior material; and a sealing step of sealing the opening. Because the electrode assembly provided in the battery can be completely impregnated with an electrolyte, no spot occurs on the surface of a negative electrode filled with the electrolyte. In addition, the flexible battery can prevent or minimize deterioration of physical characteristics that the battery is required to exhibit, even if repeated bending occurs.

8 Claims, 4 Drawing Sheets

(51) Int. Cl.
*H01M 10/058* (2010.01)
*H01M 50/105* (2021.01)

(56) References Cited

U.S. PATENT DOCUMENTS

| | | |
|---|---|---|
| 10,090,556 B2 | 10/2018 | Rho et al. |
| 2013/0101884 A1 | 4/2013 | Ueda |
| 2014/0373344 A1* | 12/2014 | Takada ................ H01G 9/08 |
| | | 29/623.5 |

FOREIGN PATENT DOCUMENTS

| | | | |
|---|---|---|---|
| JP | 11339770 A | * | 12/1999 |
| JP | 2013030353 A | | 2/2013 |
| JP | 2013140782 A | | 7/2013 |
| KR | 20170109398 A | | 9/2017 |

* cited by examiner

FLEXIBLE BATTERY MANUFACTURING METHOD

CROSS REFERENCE TO RELATED APPLICATION

This application is a 35 U.S.C. 371 National Phase Entry Application from PCT/KR2019/007011, filed Jun. 11, 2019, designating the United States, which claims the benefit of Korean Patent Application No. 10-2018-0066814 filed on Jun. 11, 2018, the disclosures of which are incorporated herein by reference in their entireties.

BACKGROUND

1. Field of the Invention

The present invention relates to a manufacturing method for a flexible battery.

2. Discussion of Related Art

As the demands of consumers change due to digitization, high performance, etc. of electronic products, the situation is that the market demand is also changing the trend toward the development of power supple devices that have a thin profile, light weight and high capacity due to high energy density.

In order to satisfy the consumer demands, power supply devices such as high energy-density and high-capacity lithium-ion secondary batteries, lithium-ion polymer batteries, supercapacitors (electric double layer capacitors) and pseudo capacitors and the like are currently being developed.

In recent years, the demand for mobile electronic devices such as mobile phones, laptops, digital cameras and the like is continuously increasing, and in particular, an interest in flexible mobile electronic devices, to which rollable displays, flexible e-paper, flexible liquid crystal display (flexible LCD), flexible organic light-emitting diode (flexible-OLED) and the like are applied, has increased recently. Accordingly, it is required that power supply devices for flexible mobile electronic devices have a flexible characteristic.

A flexible battery has been developed as one type of power supply devices that can reflect this characteristic.

The flexible battery may be a nickel-cadmium battery, a nickel-metal hydride battery, a nickel-hydrogen battery, a lithium-ion battery and the like, which have a flexible characteristic. In particular, the lithium-ion battery has high utility because it has a higher energy density per unit weight and can be charged quickly compared to other batteries such as a lead-acid battery, a nickel-cadmium battery, a nickel-hydrogen battery, a nickel-zinc battery and the like.

The lithium-ion battery uses a liquid electrolyte and has been mainly used in a welded form using a metal can as a container. However, since a cylindrical lithium-ion battery using the metal can as a container has a fixed shape, it has a disadvantage that the design of an electronic product is limited, and it is difficult to reduce the volume.

In particular, as mentioned above, mobile electronic devices are not only developed to be thinned and small-sized, but also to be flexible such that there is a problem where previous lithium-ion batteries using a metal can and batteries having a rectangular structure cannot be easily applied to the mobile electronic devices as above.

Accordingly, in order to solve the above structural problem, pouch-type batteries have been developed recently, in which an electrolyte is placed into a pouch including two electrodes and a separator to be used by sealing.

Such pouch-type batteries are made of a flexible material and can be manufactured in various forms, and have an advantage that a high energy density per mass can be implemented.

However, in the case of batteries that are commercialized or developed so far, there is a problem that an electrode assembly provided in the battery is not completely impregnated with an electrolyte such that spots occur on the surface of a negative electrode filled with the electrolyte.

SUMMARY OF THE INVENTION

The present invention has been devised to solve the above problems and is directed to providing a method for manufacturing a flexible battery that does not generate spots on the surface of a negative electrode filled with an electrolyte, as an electrode assembly provided in a battery can be completely impregnated with an electrolyte.

In addition, the present invention is also directed to providing a manufacturing method for a flexible battery that can prevent or minimize deterioration of physical characteristics that the battery is required to exhibit, even if repeated bending occurs.

In order to solve the above problems, the present invention provides a method for manufacturing a flexible battery, including an injection step of injecting an electrolyte into an opening of an exterior material accommodating an electrode assembly contained therein; an impregnation step of impregnating the electrode assembly with the electrolyte through a pressure difference inside the exterior material; and a sealing step of sealing the opening, wherein a pressure increasing/decreasing process is performed in the impregnation step and one cycle of the pressure increasing/decreasing process includes the steps of (1) decreasing the pressure inside the exterior material through the injected electrolyte; (2) maintaining the decreased pressure for a predetermined period of time; and (3) restoring the pressure inside the exterior material to 700 torr to 780 torr.

According to an exemplary embodiment of the present invention, the pressure increasing/decreasing process may repeat the cycle of steps (1) to (3) two to four times.

In addition, the pressure increasing/decreasing process may perform the cycle four to eight times with a gradient in a decreased pressure.

In addition, the decreased pressure of a pressure increasing/decreasing process performed in the next turn may be performed at a lower pressure than the decreased pressure of a pressure increasing/decreasing process performed in the previous turn.

In addition, the decreased pressure of a pressure increasing/decreasing process performed in the next turn may be performed at a pressure of 40% to 80% of the decreased pressure of a pressure increasing/decreasing process performed in the previous turn.

In addition, the exterior material of step (1) may be sealed in the area excluding the opening for injecting an electrolyte.

In addition, step (2) may be performed for 0.3 to 2 minutes. In addition, after performing step (3), the restored pressure may be maintained for 0.3 to 2 minutes when step (1) of the next cycle is performed.

In addition, the decreased pressure of the pressure increasing/decreasing process finally performed may be 3.5% to 9.5% of the initial pressure.

In addition, after the sealing process, a process of forming a pattern for contraction and relaxation in a longitudinal direction when bending part or all of the surface of the exterior material may be further included.

In addition, the area of spots due to impregnation error of an electrolyte may be 1% or less based on the total area of the upper area of a negative electrode in contact with a positive electrode in a flexible battery manufactured through the above manufacturing method.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, the present invention will be described in more detail.

Figure 1:
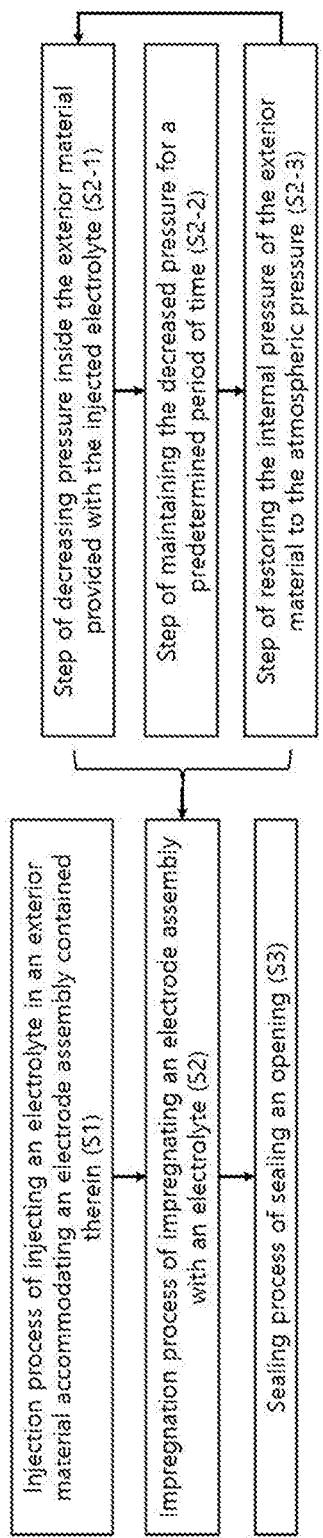
FIG. 1 is a process flowchart of the flexible battery manufacturing method according to an exemplary embodiment of the present invention.

As illustrated in FIG. 1, the manufacturing method for a flexible battery according to an exemplary embodiment of the present invention includes an injection process (S1) of injecting an electrolyte into an opening of an exterior material accommodating an electrode assembly contained therein, an impregnation process (S2) of impregnating an electrode assembly with an electrolyte through a pressure difference inside the exterior material, and a sealing process (S3) of sealing the opening, with regard to the manufacturing method for a flexible battery in which an electrode assembly is encapsulated by an exterior material with an electrolyte.

In the impregnation process, a pressure increasing/decreasing process is performed multiple times with a gradient in a decreased pressure, wherein one cycle of the pressure increasing/decreasing process includes the steps of (1) decreasing the pressure inside the exterior material provided with the injected electrolyte (S2-1); (2) maintaining the decreased pressure for a predetermined period of time (S2-2); and (3) restoring the pressure inside the exterior material to 700 to 780 torr. As described above, by performing a pressure increasing/decreasing process having steps (1) to (3) as one cycle multiple times with a gradient in a decreased pressure, an electrode assembly provided in a battery may be completely impregnated with an electrolyte, and thus an effect that no spot occurs on the surface of a negative electrode filled with an electrolyte may be achieved.

Step (1) (S2-1) is a step of decreasing the pressure inside an exterior material, and the pressure decreasing that is first performed may be performed at a pressure decreased to a 40% to 80% level of the atmospheric pressure, and preferably, a 45% to 75% level thereof, more preferably, a 55% to 70% level thereof, and still more preferably, a 60% to 70% level thereof. If the decreased pressure of the pressure increasing/decreasing process that is first performed is less than 40% of the atmospheric pressure or more than 80% thereof, an electrode assembly is not completely impregnated with an electrolyte such that spots may be generated on the surface of a negative electrode filled with an electrolyte.

Meanwhile, the exterior material of step (1) (S2-1) may be sealed in the area excluding the opening for injecting an electrolyte. In this case, the opening may be an entire area of one corner of the exterior material or a partial area of one corner of the exterior material, but as described below, in order to improve the processability of the repeated cycle and the pressure increasing/decreasing process performed multiple times, the opening may be formed over the entire area of one corner of the exterior material.

In addition, step (2) (S2-2) is a step of maintaining a decreased pressure for a predetermined period of time, and step (2) may be performed for 0.3 to 2 minutes, and preferably, 0.5 to 1.5 minutes. If the time condition is not satisfied, the electrode assembly may not be completely impregnated with an electrolyte such that spots may be generated on the surface of a negative electrode filled with an electrolyte.

In addition, step (3) (S2-3) is a step of restoring the internal pressure of the exterior material to 700 to 780 torr, and the pressure that is decreased in step (1) above may be restored to 700 to 780 torr. In this case, the restoration speed may be the same as or different from the pressure decreasing speed, but is not limited thereto.

Meanwhile, the pressure increasing/decreasing process of the impregnation process according to the present invention has steps (1) to (3) described above as one cycle, and the cycle may be repeatedly performed 2 to 4 times, and preferably, 3 to 4 times. If the cycle is performed less than 2 times, the electrode assembly is not completely impregnated with an electrolyte such that spots may be generated on the surface of a negative electrode filled with an electrolyte, and if the cycle is repeatedly performed more than 4 times, the composition of the electrolyte may be changed due to the excessive discharge of the electrolyte, the resistance may increase, and the capacity may decrease.

In addition, in the manufacturing method for a flexible battery according to the present invention, after performing step (3) (S2-3), the restored pressure may be maintained for a predetermined period of time, when step (1) (S2-1) of the next cycle is performed, and preferably, the restored pressure may be maintained for 0.3 to 2 minutes, and more preferably, for 0.5 to 1.5 minutes.

Meanwhile, the pressure increasing/decreasing process of an impregnation process according to the present invention may be performed 4 to 8 times with a gradient in a decreased pressure, and preferably, 5 to 7 times. If the pressure increasing/decreasing process is performed with a gradient in a decreased pressure less than 4 times, the electrode assembly is not completely impregnated with an electrolyte such that spots may be generated on the surface of a negative electrode filled with an electrolyte. When it is performed more than 8 times, the composition of the electrolyte may be changed due to the excessive discharge of the electrolyte, the resistance may increase, and the capacity may decrease.

In this case, the decreased pressure of the pressure increasing/decreasing process performed in the next turn may be performed at a lower pressure than the decreased pressure of the pressure increasing/decreasing process performed in the previous turn, and preferably, it may be performed at a pressure of 40% to 80% of the decreased pressure of the pressure increasing/decreasing process performed in the previous turn, and more preferably, at a pressure of 45% to 75% thereof.

If the decreased pressure of the pressure increasing/decreasing process performed in the next turn is performed at a higher pressure than the decreased pressure of the pressure increasing/decreasing process performed in the previous turn, or does not satisfy the above range compared to the decreased pressure of the pressure increasing/decreasing process performed in the previous turn, the electrode assembly is not completely impregnated with an electrode such that spots may be generated on the surface of a negative electrode filled with an electrolyte.

Meanwhile, the decreased pressure of the pressure increasing/decreasing process that is performed finally at the end may be a sufficiently low pressure compared to the initial pressure, and preferably, 3.5% to 9.5% of the initial pressure, more preferably, 4% to 9% of the initial pressure, and still more preferably, 5% to 8% of the initial pressure.

If the decreased pressure of the pressure increasing/decreasing process that is performed finally at the end is less than 3.5% of the initial pressure, the electrolyte may be excessively discharged due to a sudden increase in pressure, and if it is more than 9.5% of the initial pressure, it is difficult for the electrolyte to be absorbed inside a laminated device such that a non-impregnated area may occur.

Figure 2:
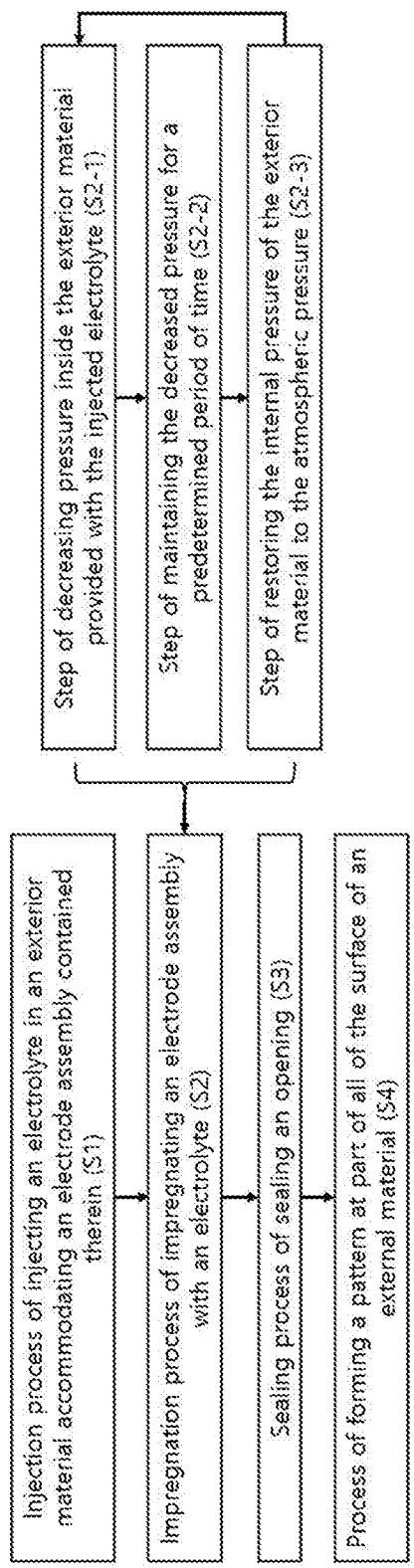
FIG. 2 is a process flowchart of the flexible battery manufacturing method according to another exemplary embodiment of the present invention.

Meanwhile, according to another exemplary embodiment of the present invention, the manufacturing method for a flexible battery according to the present invention may further include, as illustrated in FIG. 2, a process (S4) of forming a pattern for contraction and relaxation in a longitudinal direction when bending part or all of the surface of the exterior material. By performing the process forming the pattern, it is possible to significantly improve the flexible characteristics of a battery.

Figure 3:
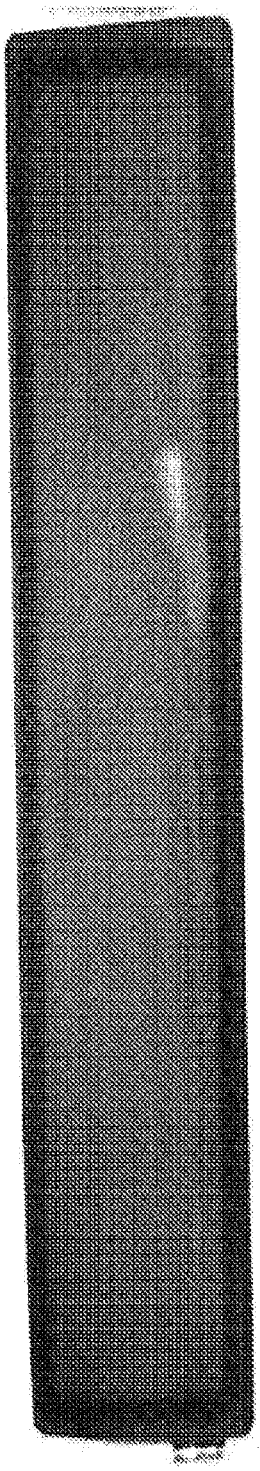
FIG. 3 is an image showing the electrolyte impregnation of a negative electrode provided in a flexible battery manufactured according to an exemplary embodiment of the present invention.

In addition, in the flexible battery manufactured through the manufacturing method above, as illustrated in FIG. 3, the area of spots due to impregnation error of an electrolyte may be 1% or less based on the total area of the upper area of a negative electrode in contact with a positive electrode, and preferably, 0.5% or less, and most preferably, no spot may exist. If the area of spots due to impregnation error of an electrolyte is more than 1% based on the total area of the upper area of a negative electrode in contact with a positive electrode, safety may be weakened due to deterioration of capacity and lifespan and lithium precipitation.

Meanwhile, for detailed descriptions for the injection process, the sealing process, the pattern formation and the like, Korean Registered Patent No. 10-1680592 by the inventors of the present invention can be inserted as a reference of the present invention, and thus the detailed description thereof will be omitted herein.

Figure 4:
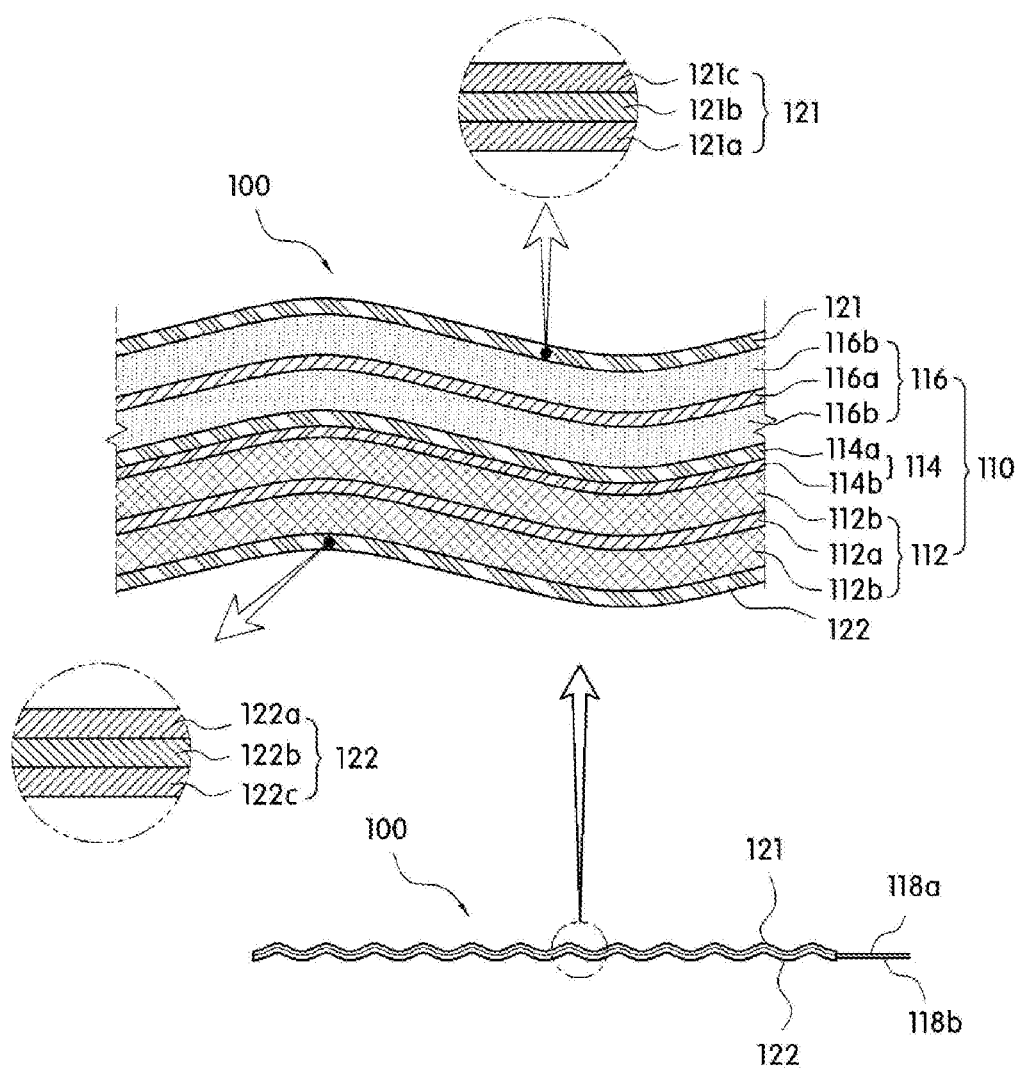
FIG. 4 is an enlarged view illustrating the detailed constitution of a flexible battery manufactured according to an exemplary embodiment of the present invention.

Meanwhile, as illustrated in FIG. 4, the flexible battery 100 manufactured according to an exemplary embodiment of the present invention may include a positive electrode 112 provided with a positive electrode current collector 112a in which part or all of at least one surface thereof is coated with a positive electrode active material 112b, a negative electrode 116 provided with a foil-type negative electrode current collector 116a in which part or all of at least one surface thereof is coated with a negative electrode active material 116b, and an electrode assembly 110 provided with a separator 114 disposed between the positive electrode 112 and the negative electrode 116; an electrolyte; and an exterior material 120 encapsulating the electrode assembly 110 with an electrolyte.

First, the electrode assembly 110 will be described.

The electrode assembly 110 is encapsulated with an electrolyte inside the exterior material 120, and as illustrated in FIG. 4, it may include a positive electrode 112, a negative electrode 116 and a separator 114.

The positive electrode 112 may include a positive electrode current collector 112a and a positive electrode active material 112b, and the negative electrode 116 may include a negative electrode current collector 116a and a negative electrode active material 116b. Also, the positive electrode current collector 112a and the negative electrode current collector 116a may be implemented in the form of a plate-shaped sheet having a predetermined area.

That is, the positive electrode 112 and the negative electrode 116 may be pressed, deposited or applied with active materials 112b and 116b on one or both surfaces of each of the current collectors 112a and 116a. In this case, the active materials 112b and 116b may be provided on part or all of at least one surface of the current collectors 112a and 116a.

In this case, the positive electrode current collector 112a may be used without limitation as long as it is a material that is commonly used in the art as a positive electrode current collector of a flexible battery, and preferably, aluminum (Al) may be used.

In addition, the negative electrode current collector 116a may be used without limitation as long as it is a material that is commonly used in the art as a negative electrode current collector of a flexible battery, and preferably, copper (Cu) may be used.

In addition, as illustrated in FIG. 4, the positive electrode current collector 112a and the negative electrode current collector 116a may be formed with a negative electrode terminal 118a and a positive electrode terminal 118b for electrical connection from each body to an external device, respectively. Herein, the positive electrode terminal 118b and the negative electrode terminal 118a may be provided to extend from the positive electrode current collector 112a and the negative electrode current collector 116a so as to protrude to one side of the exterior material, and so as to be exposed on the surface of the exterior material.

Meanwhile, the positive electrode active material 112b may include a positive electrode active material capable of reversibly intercalating and deintercalating lithium ions, and representative examples of such a positive electrode active material may include a lithium-transition metal oxide such as $LiCoO_2$, $LiNiO_2$, $LiNiCoO_2$, $LiMnO_2$, $LiMn_2O_4$, $V_2O_5$, $V_6O_{13}$, $LiNi_{1-x-y}Co_xM_yO_2$ ($0 \leq x \leq 1$, $0 \leq y \leq 1$, $0 \leq x+y \leq 1$, M is a metal such as Al, Sr, Mg, La, etc.) and a lithium nickel cobalt manganese (NCM)-based active material to be used, and a mixture of one or more thereof mixed therein may be used.

In addition, the negative electrode active material 116b may include a negative electrode active material capable of reversibly intercalating and deintercalating lithium ions, and such a negative electrode active material may be selected from the group consisting of crystalline or amorphous carbon, carbon fiber, or a carbon-based negative active material of a carbon composite, tin oxide, the lithiated product thereof, lithium, a lithium alloy and a mixture of one or more thereof mixed therein. In this case, carbon may be one or more selected from the group consisting of a carbon nanotube, a carbon nanowire, a carbon nanofiber, black lead, activated carbon, graphene and graphite.

However, the positive electrode active material and the negative electrode active material used in the present invention are not limited thereto, and it is to be clear that the positive electrode active material and the negative electrode active material that are commonly used in the art may all be used.

In this case, in the present invention, the positive electrode active material 112b and the negative electrode active material 116b may contain a polytetrafluoroethylene (PTFE) component. This is to prevent the positive electrode active material 112b and the negative electrode active material 116b from being peeled off from each of the current collectors 112a and 116a, or cracks from being generated.

Meanwhile, a separator 114 disposed between the positive electrode 112 and the negative electrode 116 may include a nanofiber web layer 114b on one surface or both surfaces of a non-woven fabric layer 114a.

Herein, the nanofiber web layer 114b may be a nanofiber containing one or more selected from a polyacrylonitrile nanofiber and a polyvinylidene fluoride nanofiber.

In addition, for the separator 114, when a gel polymer electrolyte is used as the electrolyte, a composite porous separator may be used in order to optimize the impregnability of the gel polymer electrolyte.

That is, the composite porous separator is used as a matrix, and it may include a porous non-woven fabric having micropores and a porous nano fiber web which is formed of a spinnable polymer material and impregnated with an electrolyte.

The exterior material is composed of a plate-shaped member having a predetermined area and is intended to protect the electrode assembly 110 from external forces by accommodating the electrode assembly and the electrolyte therein.

To this end, the exterior material is provided with a pair of a first exterior material 121 and a second exterior material 122 as illustrated in FIG. 4, and by sealing with an adhesive along the edge, the electrolyte and the electrode assembly 110 accommodated therein are prevented from being exposed to the outside and leaking to the outside.

The exterior material may be provided in a form in which metal layers 121b and 122b are interposed between first resin layers 121a and 122a and second resin layers 121c and 122c. That is, the exterior material is constituted in a form in which the first resin layers 121a and 122a, the metal layers 121b and 122b and the second resin layers 121c and 122c are sequentially laminated, and the first resin layers 121a and 122a are disposed inside to be in contact with an electrolyte, and the second resin layers 121c and 122c are exposed to the outside.

Meanwhile, an electrolyte encapsulated with the electrode assembly 110 may be a liquid electrolyte that is commonly used in the art.

For example, the electrolyte may be an organic electrolyte containing a non-aqueous organic solvent and a solute of lithium salts to be used. Herein, carbonate, ester, ether or ketone may be used as the non-aqueous organic solvent. Dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC) and the like may be used as the carbonate. Butyrolactone (BL), decanolide, valerolactone, mevalonolactone, caprolactone, n-methyl acetate, n-ethyl acetate, n-propyl acetate and the like may be used as the ester. Dibutyl ether, etc. may be used as the ether, and polymethyl vinyl ketone may be used as the ketone. However, the present invention is not limited by the type of non-aqueous organic solvents.

In addition, the electrolyte used in the present invention may include a lithium salt, and the lithium salt acts as a source of lithium ions in the battery to enable the operation of a basic lithium battery, and examples thereof may include one or more selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)$ $(C_yF_{2y+1}SO_2)$ (herein, x and y are rational numbers) and $LiSO_3CF_3$, or a mixture thereof.

In this case, the electrolyte used in the flexible battery 100 according to the present invention may be a conventional liquid electrolyte, but preferably, a gel polymer electrolyte may be used, and through this, it can prevent the occurrence of gas leakage and liquid leakage, which may occur in a flexible battery provided with a liquid electrolyte in the event of being bent.

For the gel polymer electrolyte, a gel polymer electrolyte may be formed by gelating heat treatment of a non-aqueous organic solvent and a solute of lithium salts and an organic electrolyte including a monomer for gel polymer formation and a polymerization initiator. For the gel polymer electrolyte as the above, the organic electrolyte may be thermally treated alone, but monomers may be in-situ polymerized by applying heat treatment in a condition in which the organic electrolyte is impregnated in a separator provided inside a flexible battery, and it may be implemented in a form in which a gel polymer in the gel state is impregnated in the pores of the separator 114. The in-situ polymerization reaction proceeds through heat polymerization inside the flexible battery, the polymerization time takes about 20 minutes to 12 hours, and the heat polymerization may be performed at 40° C. to 90° C.

In this case, for the monomer for gel polymer formation, any monomer may be used as long as a polymerization reaction proceeds by a polymerization initiator and a polymer forms a gel polymer. Examples thereof include monomers for methyl methacrylate (MMA), polyethylene oxide (PEO), polypropylene oxide (PPO), polyacrylonitrile (PAN), polyvinylidene fluoride (PVDF), polymethacrylate (PMA), polymethyl methacrylate (PMMA) or a polymer thereof, or a polyacrylate having two or more functional groups, such as polyethylene glycol dimethacrylate and polyethylene glycol acrylate.

In addition, examples of the polymerization initiator include organic peroxides or hydroperoxides such as benzoyl peroxide, acetyl peroxide, dilauryl peroxide, di-tert-butylperoxide, cumyl hydroperoxide, hydrogen peroxide and the like, and azo compounds such as 2,2-azobis(2-cyanobutane), 2,2-azobis(methylbutyronitrile) and the like. The polymerization initiator may be decomposed by heat to form radicals and react with monomers by free radical polymerization to form a gel polymer electrolyte, that is, a gel polymer.

Meanwhile, since the manufacturing method for a flexible battery according to the present invention may completely impregnate an electrode assembly provided in a battery with an electrolyte, there is an effect that no spot occurs on the surface of a negative electrode filled with an electrolyte. In addition, the flexible battery manufactured according to the manufacturing method of the present invention may prevent or minimize deterioration of physical characteristics that the battery is required to exhibit, even if repeated bending occurs.

Although the present invention will be described in more detail with reference to the following examples, these examples are not intended to limit the scope of the present invention, and it is to be construed to help the understanding of the present invention.

Example 1

First, a metal layer of an aluminum material having a thickness of 30 μm was prepared, a first resin layer having a thickness of 40 μm and composed of casting polypropylene (CCP) was formed on one surface of the metal layer, and a second resin layer having a thickness of 10 μm and composed of a nylon film was formed on the other surface of the metal layer. In this case, an acid-modified polypropylene layer, in which the content of acrylic acid was contained at 6% by weight in the copolymer, was interposed between the first resin layer and the metal layer at 5 μm to manufacture an exterior material having a total thickness of 85 μm.

Next, to manufacture an electrode assembly, first, a positive electrode assembly and a negative electrode assembly were prepared. The positive electrode assembly was manufactured by casting a lithium nickel cobalt manganese (NCM)-based positive electrode active material on both surfaces of a positive electrode current collector made of aluminum at a thickness of 20 μm such that the final thickness was 120 μm. In addition, the negative electrode assembly was manufactured by casting a graphite negative electrode active material on both surfaces of a 20% elongated foil-type negative electrode current collector having a thickness of 15 μm and made of a copper material such that the final thickness was 115 μm. Afterwards, a separator having a thickness of 20 μm and made of a PET/PEN material was prepared, and a positive electrode assembly, a separator and a negative electrode assembly were alternately laminated to manufacture an electrode assembly including three positive electrode assemblies, eight separators and four negative electrode assemblies.

Afterwards, the first resin layer of the prepared exterior material was folded such that it became an inner surface, and while the electrode assembly was disposed inside the exterior material such that the folded first resin layer of the exterior material came into contact with the electrode assembly, one corner was left as an opening into which an electrolyte could be injected, and it was thermally pressed at a temperature of 150° C. for 10 seconds. Afterwards, an electrolyte for secondary batteries including $LiPF_6$ as a lithium salt, 20% by volume of ethylene carbonate as a non-aqueous organic solvent, 5% by volume of propylene carbonate, 50% by volume of propyl propionate and 25% by volume of ethyl propionate, and 0.5% by weight of vinylene carbonate, 2% by weight of 1,3-propanesultone, 2.5% by weight of fluoroethylene carbonate and by weight of adiponitrile, based on the total weight of the electrolyte for secondary batteries as additives, was injected into the one corner. Then, the pressure inside the exterior material was decreased from 760 torr to 450 torr as step (1), the decreased pressure was maintained for 1 minute as step (2), and the pressure inside the exterior material was restored to the atmospheric pressure as step (3). The pressure increasing/decreasing process was performed by repeating a cycle of steps (1) to (3) three times. Afterwards, it was maintained at the atmospheric pressure for 1 minute, and while performing in the same manner as the pressure increasing/decreasing process, it was changed to the decreased pressures of Table 1 below to perform the second, third, fourth, fifth and sixth pressure increasing/decreasing processes to impregnate the electrode assembly with the electrolyte. Then, a battery was manufactured by heat compression for 10 seconds at a temperature of 150° C. to seal the opening. Afterwards, a flexible battery was manufactured by forming a wave pattern.

Examples 2 to 15 and Comparative Example 1

While manufactured in the same manner as in Example 1, flexible batteries were manufactured by changing the number of cycles in the pressure increasing/decreasing process, the number of times of the pressure increasing/decreasing process performance, the pressure compared to the previous pressure increasing/decreasing process, the final decreased pressure compared to the initial pressure and the like as in Tables 1 to 3.

Experimental Example

For the flexible batteries manufactured according to the above Examples and Comparative Example, the following physical characteristics were evaluated and shown in Tables 1 to 3.

1. Spot Occurrence Evaluation

For the flexible batteries manufactured according to the Examples and Comparative Example above, spot occurrence was evaluated by visually confirming the charging area of the total number of the negative electrodes by disassembling after charging to 100%.

In this case, spot occurrence was evaluated as the following. When no spot occurred, it was indicated as—⊚. When the spot area was 0.5% or less based on the total area of the upper area of the negative electrode in contact with the positive electrode, it was indicated as—○. When the spot area was more than 0.5% and 2% or less, it was indicated as—Δ. When the spot area was more than 2%, it was indicated as—x.

2. Durability Evaluation

For each of the flexible batteries manufactured according to the Examples and Comparative Example above, the durability of the flexible batteries was evaluated as the following. When there was no abnormality when the flexible battery was folded 100 times such that the uniaxial ends of the flexible battery were in contact with each other, it was indicated as—○. When any problem occurred such as deterioration of electrical properties, damage to the junction, leakage of electrolytes and the like, it was indicated as—x.

3. Resistance Evaluation

For each of the flexible batteries manufactured according to the Examples and Comparative Example, resistance was evaluated using the AC-IR meter facility.

TABLE 1

| | Classification | | Example 1 | Example 2 | Example 3 | Example 4 | Example 5 |
|---|---|---|---|---|---|---|---|
| Pressure increasing/decreasing process | Number of cycles in the pressure increasing/decreasing process (cycle) | | 3 | 1 | 5 | 3 | 3 |
| | $1^{st}$ | Decreased pressure | 450 | 450 | 450 | 340 | 450 |

TABLE 1-continued

| | Classification | | Example 1 | Example 2 | Example 3 | Example 4 | Example 5 |
|---|---|---|---|---|---|---|---|
| | | (Torr) | | | | | |
| | | Pressure compared to the atmospheric pressure (%) | 59.2 | 59.2 | 59.2 | 44.7 | 59.2 |
| | $2^{nd}$ | Decreased pressure (Torr) | 300 | 300 | 300 | 155 | 300 |
| | | Pressure compared to the previous cycle (%) | 66.7 | 66.7 | 66.7 | 45.6 | 66.7 |
| | $3^{rd}$ | Decreased pressure (Torr) | 200 | 200 | 200 | 70 | 200 |
| | | Pressure compared to the previous cycle (%) | 66.7 | 66.7 | 66.7 | 45.2 | 66.7 |
| | $4^{th}$ | Decreased pressure (Torr) | 100 | 100 | 100 | — | 100 |
| | | Pressure compared to the previous cycle (%) | 50 | 50 | 50 | — | 50 |
| | $5^{th}$ | Decreased pressure (Torr) | 70 | 70 | 70 | — | 50 |
| | | Pressure compared to the previous cycle (%) | 70 | 70 | 70 | — | 50 |
| | $6^{th}$ | Decreased pressure (Torr) | 50 | 50 | 50 | — | — |
| | | Pressure compared to the previous cycle (%) | 71.4 | 71.4 | 71.4 | — | — |
| | $7^{th}$ | Decreased pressure (Torr) | — | — | — | — | — |
| | | Pressure compared to the previous cycle (%) | — | — | — | — | — |
| | $8^{th}$ | Decreased pressure (Torr) | — | — | — | — | — |
| | | Pressure compared to the previous cycle (%) | — | — | — | — | — |
| | $9^{th}$ | Decreased pressure (Torr) | — | — | — | — | — |
| | | Pressure compared to the previous cycle (%) | — | — | — | — | — |
| | Final decreased pressure compared to the initial (atmospheric) pressure (%) | | 6.58 | 6.58 | 6.58 | 9.21 | 6.58 |
| Evaluation of physical characteristics | Evaluation of spot occurrence | | ◎ | Δ | ◎ | Δ | ◎ |
| | Evaluation of durability | | ○ | X | X | X | ○ |
| | Resistance (mΩ) | | 22.5 | 22.7 | 30.4 | 22.6 | 22.5 |

40

TABLE 2

| | Classification | | Example 6 | Example 7 | Example 8 | Example 9 | Example 10 |
|---|---|---|---|---|---|---|---|
| Pressure increasing/decreasing process | Number of cycles in the pressure increasing/decreasing process (cycle) | | 3 | 3 | 3 | 3 | 3 |
| | $1^{st}$ | Decreased pressure (Torr) | 530 | 570 | 646 | 380 | 425 |
| | | Pressure compared to the atmospheric pressure (%) | 69.7 | 75 | 85 | 50 | 55.9 |
| | $2^{nd}$ | Decreased pressure (Torr) | 370 | 425 | 549 | 210 | 270 |
| | | Pressure compared to the previous cycle (%) | 69.8 | 74.6 | 85 | 55.3 | 63.5 |
| | $3^{rd}$ | Decreased pressure (Torr) | 260 | 315 | 192 | 115 | 170 |
| | | Pressure compared to the previous cycle (%) | 70.3 | 74.1 | 35 | 54.8 | 63 |
| | $4^{th}$ | Decreased pressure (Torr) | 180 | 235 | 163 | 52 | 90 |
| | | Pressure compared to the previous cycle (%) | 69.2 | 74.6 | 85 | 45.2 | 52.9 |
| | $5^{th}$ | Decreased pressure (Torr) | 125 | 175 | 57 | 32 | 60 |
| | | Pressure compared to the previous cycle (%) | 69.4 | 74.5 | 35 | 61.5 | 66.7 |
| | $6^{th}$ | Decreased pressure (Torr) | 86 | 130 | 48.5 | 18.5 | 39 |

TABLE 2-continued

| Classification | | | Example 6 | Example 7 | Example 8 | Example 9 | Example 10 |
|---|---|---|---|---|---|---|---|
| | | Pressure compared to the previous cycle (%) | 68.8 | 74.3 | 85 | 57.8 | 65 |
| | $7^{th}$ | Decreased pressure (Torr) | 60 | 95 | — | — | — |
| | | Pressure compared to the previous cycle (%) | 69.8 | 73.1 | — | — | — |
| | $8^{th}$ | Decreased pressure (Torr) | — | 70 | — | — | — |
| | | Pressure compared to the previous cycle (%) | — | 73.7 | — | — | — |
| | $9^{th}$ | Decreased pressure (Torr) | — | 52.5 | — | — | — |
| | | Pressure compared to the previous cycle (%) | — | 75 | — | — | — |
| | | Final decreased pressure compared to the initial (atmospheric) pressure (%) | 7.89 | 6.91 | 6.38 | 2.43 | 5.13 |
| Evaluation of physical characteristics | | Evaluation of spot occurrence | ◎ | ◯ | Δ | ◯ | ◎ |
| | | Evaluation of durability | ◯ | X | X | X | ◯ |
| | | Resistance (mΩ) | 22.7 | 29.8 | 22.8 | 29.4 | 22.8 |

TABLE 3

| Classification | | | Example 11 | Example 12 | Comparative Example 1 |
|---|---|---|---|---|---|
| Pressure increasing/ decreasing process | Number of cycles in the pressure increasing/decreasing process (cycle) | | 3 | 3 | 3 |
| | $1^{st}$ | Decreased pressure (Torr) | 456 | 494 | 340 |
| | | Pressure compared to the atmospheric pressure (%) | 60 | 65 | 44.7 |
| | $2^{nd}$ | Decreased pressure (Torr) | 318 | 365 | — |
| | | Pressure compared to the previous cycle (%) | 69.7 | 73.9 | — |
| | $3^{rd}$ | Decreased pressure (Torr) | 220 | 270 | — |
| | | Pressure compared to the previous cycle (%) | 69.2 | 74 | — |
| | $4^{th}$ | Decreased pressure (Torr) | 130 | 162 | — |
| | | Pressure compared to the previous cycle (%) | 59.1 | 60 | — |
| | $5^{th}$ | Decreased pressure (Torr) | 88 | 120 | — |
| | | Pressure compared to the previous cycle (%) | 67.7 | 74.1 | — |
| | $6^{th}$ | Decreased pressure (Torr) | 60 | 84 | — |
| | | Pressure compared to the previous cycle (%) | 68.2 | 70 | — |
| | $7^{th}$ | Decreased pressure (Torr) | — | — | — |
| | | Pressure compared to the previous cycle (%) | — | — | — |
| | $8^{th}$ | Decreased pressure (Torr) | — | — | — |
| | | Pressure compared to the previous cycle (%) | — | — | — |
| | $9^{th}$ | Decreased pressure (Torr) | — | — | — |
| | | Pressure compared to the previous cycle (%) | — | — | — |
| | Final decreased pressure compared to the initial (atmospheric) pressure (%) | | 7.89 | 11 | 44.7 |
| Evaluation of physical characteristics | Evaluation of spot occurrence | | ◎ | Δ | X |
| | Evaluation of durability | | ◯ | X | X |
| | Resistance (mΩ) | | 22.7 | 28.6 | 23.1 |

As can be seen in Tables 1 to 3 above, it was confirmed that Example 1, Example 5, Example 6, Example 10 and Example 11, which satisfied all of the number of cycles in the pressure increasing/decreasing process, the number of performances of the pressure increasing/decreasing process, the pressure compared to the previous pressure increasing/decreasing process, the final decreased pressure compared to the initial pressure, whether the pressure increasing/decreasing process is performed, and the like according to the present invention, exhibited all of the effects of no spot occurrence, excellent durability and reduced resistance at the same time, compared to Examples 2 to 4, 7 to 9, 12 and Comparative Example 1 in which any one of the above was omitted.

The manufacturing method for a flexible battery according to the present invention has an effect that no spot occurs on the surface of a negative electrode filled with an electrolyte, because an electrode assembly provided in the battery can be completely impregnated with an electrolyte.

In addition, the flexible battery manufactured according to the manufacturing method for a flexible battery of the present invention can prevent or minimize deterioration of physical characteristics that the battery is required to exhibit, even if repeated bending occurs.

Although exemplary embodiments of the present invention are described above, the spirit of the present invention is not limited to the exemplary embodiments presented in the present specification, and although those skilled in the art may provide other exemplary embodiments through the addition, change, or removal of components within the scope of the same spirit of the present invention, such embodiments are also included in the scope of the spirit of the present invention.

What is claimed is:

1. A method for manufacturing a flexible battery, comprising:
    an injection step of injecting an electrolyte into an opening of an exterior material accommodating an electrode assembly contained therein;
    an impregnation step of impregnating the electrode assembly with the electrolyte through a pressure difference inside the exterior material; and
    a sealing step of sealing the opening,
    wherein a pressure increasing/decreasing process is performed in the impregnation step and one cycle thereof comprises the steps of:
    (1) decreasing the pressure inside the exterior material through the injected electrolyte;
    (2) maintaining the decreased pressure for a predetermined period of time; and
    (3) restoring the pressure inside the exterior material to 700 torr to 780 torr,
    wherein the pressure increasing/decreasing process is performed four to eight times with a gradient in the decreased pressure, and
    wherein the decreased pressure of the pressure increasing/decreasing process performed in the next turn is performed at a pressure of 40% to 80% of the decreased pressure of the pressure increasing/decreasing process performed in the previous turn.

2. The method of claim 1, wherein in each of the pressure increasing/decreasing process, the one cycle of steps (1) to (3) is performed two to four times.

3. The method of claim 2, wherein after performing step (3), the restored pressure is maintained for 0.3 to 2 minutes when step (1) of the next cycle is performed.

4. The method of claim 1, wherein the exterior material of step (1) is sealed in an area excluding the opening for injecting the electrolyte.

5. The method of claim 1, wherein step (2) is performed for 0.3 to 2 minutes.

6. The method of claim 1, wherein the decreased pressure of the pressure increasing/decreasing process finally performed is 3.5 to 9.5% of the initial pressure.

7. The method of claim 1, further comprising a process of forming a pattern for contraction and relaxation in a longitudinal direction when bending part or all of the surface of the exterior material.

8. The method of claim 1, wherein a spot area due to an impregnation error of the electrolyte is 1% or less based on a total area of an upper area of a negative electrode in contact with a positive electrode in the flexible battery manufactured through the manufacturing method.

* * * * *